US010953604B2

(12) United States Patent
Schumann et al.

(10) Patent No.: US 10,953,604 B2

(45) Date of Patent: Mar. 23, 2021

(54) SYSTEM AND METHOD FOR ADDITIVE PRODUCTION OF THREE-DIMENSIONAL OBJECTS WITH GRAPHICAL DISPLAY

(71) Applicant: CL SCHUTZRECHTSVERWALTUNGS GMBH, Lichtenfels (DE)

(72) Inventors: Philipp Schumann, Itzgrund-Schottenstein (DE); Ralf Hetzel, Bad Staffelstein (DE); Tanja Traut, Weitramsdorf (DE)

(73) Assignee: CONCEPT LASER GMBH, Lichtenfels (DE)

( * ) Notice: Subject to any disclaimer, the term of this patent is extended or adjusted under 35 U.S.C. 154(b) by 0 days.

(21) Appl. No.: 15/911,766

(22) Filed: Mar. 5, 2018

(65) Prior Publication Data

US 2018/0250884 A1 Sep. 6, 2018

(30) Foreign Application Priority Data

Mar. 3, 2017 (DE) ......................... 102017104506.6

(51) Int. Cl.
*B29C 64/393* (2017.01)
*B29C 64/364* (2017.01)
(Continued)

(52) U.S. Cl.
CPC .......... *B29C 64/393* (2017.08); *B22F 3/1055* (2013.01); *B29C 64/153* (2017.08); (Continued)

(58) Field of Classification Search
None
See application file for complete search history.

(56) References Cited

U.S. PATENT DOCUMENTS 6,930,278 B1 8/2005 Chung et al.
8,137,739 B2 3/2012 Philippi et al.
(Continued)

FOREIGN PATENT DOCUMENTS

DE 102004017769 A1 12/2004
DE 102014203711 A1 9/2015
(Continued)

OTHER PUBLICATIONS

Japanese Office Action Notice of Refusal Corresponding to JP2018016854.

*Primary Examiner* — Bernard G Lindsay

(74) *Attorney, Agent, or Firm* — Dority & Manning, P.A.

(57) ABSTRACT

Apparatus for the additive production of three-dimensional objects by successive layerwise selective exposure and consequent successive layerwise selective solidification of construction material layers of a construction material that can be solidified by means of an energy beam, comprising: —an exposure device, which is configured in order to generate an energy beam for the successive layerwise selective exposure and consequent successive layerwise selective solidification of construction material layers of a construction material that can be solidified by means of the energy beam, and—a measuring device for measuring a temperature, wherein the measuring device is configured in order to measure a temperature at at least one measurement point, the measurement point being assigned to at least one three-dimensional object formed at least partially from solidified construction material or to at least one object section formed in the scope of the additive production of an object to be produced additively.

19 Claims, 2 Drawing Sheets

(51) Int. Cl.

| | |
|---|---|
| ***B33Y 30/00*** | (2015.01) |
| ***B33Y 50/02*** | (2015.01) |
| ***B22F 3/105*** | (2006.01) |
| ***B33Y 40/00*** | (2020.01) |
| ***B33Y 10/00*** | (2015.01) |
| ***B29C 64/268*** | (2017.01) |
| ***B29C 64/153*** | (2017.01) |
| ***B29C 64/255*** | (2017.01) |
| ***B29C 64/25*** | (2017.01) |

(52) U.S. Cl.

CPC ............ *B29C 64/25* (2017.08); *B29C 64/255* (2017.08); *B29C 64/268* (2017.08); *B29C 64/364* (2017.08); *B33Y 10/00* (2014.12); *B33Y 30/00* (2014.12); *B33Y 40/00* (2014.12); *B33Y 50/02* (2014.12); *B22F 2003/1056* (2013.01)

(56) References Cited

U.S. PATENT DOCUMENTS

2007/0196561 A1* 8/2007 Philippi ................ B29C 64/153 427/8
2010/0111744 A1 5/2010 Schleiss et al.
2013/0168902 A1* 7/2013 Herzog ................. B22F 3/1055 264/401
2016/0074965 A1 3/2016 Jakimov et al.
2016/0179064 A1* 6/2016 Arthur .................. G05B 15/02 700/98
2016/0236299 A1* 8/2016 Oberhofer ............ B23K 26/144
2016/0271884 A1 9/2016 Herzog
2016/0326880 A1 11/2016 Slavens et al.
2016/0339642 A1* 11/2016 Donovan .............. B29C 64/165
2017/0001243 A1 1/2017 Hayano
2017/0014906 A1 1/2017 Ng et al.
2017/0157850 A1 6/2017 Duan et al.
2018/0050494 A1* 2/2018 Coeck .................... B33Y 10/00
2018/0141123 A1* 5/2018 Revanur ................ B33Y 50/00
2019/0009463 A1* 1/2019 Vilajosana ............ B29C 64/165

FOREIGN PATENT DOCUMENTS

| | | | |
|---|---|---|---|
| DE | 102015108131 | A1 | 11/2016 |
| DE | 102015214994 | A1 | 2/2017 |
| EP | 1634694 | B1 | 12/2009 |
| EP | 2789413 | A1 | 10/2014 |
| JP | 2008508129 | A | 3/2008 |
| JP | 4076091 | B2 | 4/2008 |
| JP | WO2016026415 | A1 | 2/2016 |
| JP | 2018095911 | A | 6/2018 |
| JP | 6483809 | B2 | 3/2019 |

* cited by examiner

Object 1: 632 K
Object 2: 645K
Object 3: 627 K
Object 4: 661 K
14
15
15a
15b
16a
16b
16c
2
P

SYSTEM AND METHOD FOR ADDITIVE PRODUCTION OF THREE-DIMENSIONAL OBJECTS WITH GRAPHICAL DISPLAY

CROSS-REFERENCE TO RELATED APPLICATIONS

This application claims priority to German Patent Application serial no. 10 2017 104 506.6 filed Mar. 3, 2017, the contents of which are incorporated herein by reference in their entirety as if set forth verbatim.

DESCRIPTION

The invention relates to an apparatus for the additive production of three-dimensional objects by successive layerwise selective exposure and consequent successive layerwise selective solidification of construction material layers of a construction material that can be solidified by means of an energy beam, comprising an exposure device, which is configured in order to generate an energy beam for the successive layerwise selective exposure and consequent successive layerwise selective solidification of construction material layers of a construction material that can be solidified by means of the energy beam, having the further features of the precharacterizing clause according to the claims.

Such an apparatus for the additive production of three-dimensional objects is known per se. By means of a corresponding apparatus, three-dimensional objects to be produced are constructed additively by successive layerwise selective exposure and consequent successive layerwise selective solidification of construction material layers in the regions corresponding to the layer-related cross section of the object to be produced, from a construction material that can be solidified by means of an energy beam.

It is furthermore known to assign to the apparatus a temperature determining device, which is configured in order to determine the temperature of various component parts of the apparatus.

The known measuring devices are not suitable for obtaining information about the temperature and therefore inferences about the formation of a particular structure in the three-dimensional object to be generated by selective solidification of construction material. To date, it has therefore also not been possible to intervene advantageously with the aid of such information in the process of constructing or forming the three-dimensional object to be solidified from construction material.

The object of the invention is therefore to provide an improved apparatus in relation to the prior art for the additive production of three-dimensional objects, with the aid of which it is possible even during the construction process to determine data on the basis of which parameters of the construction process can be adapted.

The object is achieved by an apparatus for the additive production of three-dimensional objects according to the claims. The claims dependent thereon relate to possible embodiments of the apparatus.

The apparatus described here ("apparatus") is configured for the additive production of three-dimensional objects, i.e. for example technical components or technical component groups, by successive layerwise selective exposure and consequent successive layerwise selective solidification of construction material layers of a construction material that can be solidified in the regions corresponding to the layer-related cross section of the object to be produced. The construction material may be a particulate or powdered metal material, plastic material and/or ceramic material. The selective solidification of respective construction material layers to be selectively solidified is carried out on the basis of object-related construction data. Corresponding construction data describe the geometry-design configuration of the object respectively to be produced additively, and may for example contain "sliced" CAD data of the object respectively to be produced additively. The apparatus may be configured as an SLM apparatus, i.e. as an apparatus for carrying out selective laser melting methods (SLM methods), or as an SLS apparatus, i.e. as an apparatus for carrying out selective laser sintering methods (SLS methods). It is also conceivable for the apparatus to be configured as an SEBS apparatus, i.e. as an apparatus for carrying out selective electron beam melting methods (SEBS methods).

The apparatus comprises the functional component parts typically required in order to carry out additive construction processes. These include, in particular, a layering device and an exposure device.

The layering device is configured in order to form construction material layers to be selectively exposed, or to be selectively solidified, in a construction plane or a construction zone of the apparatus, in which the successive layerwise selective exposure and the consequent successive layerwise selective solidification of construction material layers of the construction material that can be solidified by means of an energy beam are carried out.

The exposure device is configured in order to generate an energy beam, i.e. in particular a laser beam, for the successive layerwise selective exposure and consequent successive layerwise selective solidification of construction material layers of a construction material that can be solidified by means of the energy beam. The exposure device may comprise an energy beam generating device, which is configured for the actual generation of the energy beam, and a beam steering device (scanner device) which is configured in order to steer the energy beam onto a construction material layer to be selectively solidified, as respective constituent parts of the exposure device.

The apparatus comprises a measuring device. The measuring device is configured in order to measure the temperature of at least one measurement point inside the construction plane in which the successive layerwise selective solidification of the construction material is carried out. By means of the measuring device, which is configured in particular as a thermography camera or at least comprises such a camera, it is consequently possible to acquire measurement points inside a construction material layer which is to be or has been selectively solidified. Measurement points determined or measured by means of the measuring device are assigned to at least one three-dimensional object formed at least partially from solidified construction material or to at least one object section formed in the scope of the additive production of an object to be produced additively. The measuring device is thus, in particular, configured in order to determine or measure the temperature of at least one object to be produced additively or of at least one object section formed in the scope of the additive production of an object to be produced additively. In this way, inferences can be obtained about various parameters, which may possibly be variable in the scope of the construction process, for example structural parameters, of the object or object section.

The apparatus may comprise various powder modules which can be docked, particularly on the bottom side, to an inertizable process chamber of the apparatus. A corresponding powder module may, for example, be a construction module in which the actual additive construction of the object or objects to be produced additively is carried out. The at least one measurement point may lie in the construction plane. Here, the construction plane is arranged or formed adjacent to a construction module of the apparatus, which is docked, particularly on the bottom side, to the process chamber of the apparatus. The construction plane may also be arranged or formed inside the construction material. Of course, the at least one measurement point may also lie inside a construction module which is docked, particularly on the bottom side, to a process chamber of the apparatus.

In order to obtain a maximally comprehensive picture of the object parameters, which may possibly be variable in the scope of the construction process, a plurality of measurement points may also be assigned to a three-dimensional object. The temperature of the object can therefore be measured several times spatially and/or chronologically, i.e. at different positions on the object or at different times.

A displaying device, which is configured in order to display a temperature measured at the at least one measurement point, may be assigned to the apparatus. The displaying device may be arranged or formed on a housing section of the apparatus. The displaying device may form a constituent part of a user interface on the apparatus side. The displaying device may be a display, in particular a touch display. The data measured by means of the measuring device may be represented by means of the displaying device in a wide variety of alphanumeric and/or graphical display options.

The measuring device typically comprises a data transfer unit and a control unit, implemented as hardware and/or software, for regulating a temperature regulating device, or the measuring device is assigned a corresponding data transfer unit and a corresponding control unit. Data measured by means of the measuring device may therefore also be transmitted via the data transfer unit to an external communication partner, for example to an external monitoring device for monitoring a construction process.

The temperature regulating device, if there is one, is configured in such a way that the temperature at one or more measurement or spatial points inside the construction plane, optionally inside a construction module, can be modified as a function of the temperature(s) measured/determined by means of the measuring device. To this end, the temperature regulating device is configured in order to generate control instructions intended for temperature control devices on the apparatus side or on the construction module side, i.e. in particular heating devices, which are set on the basis of the control instructions into corresponding operating states so that controlled regulation of the temperature of the construction material, or of the object, is possible.

The invention furthermore relates to a method for the additive production of three-dimensional objects by successive layerwise selective exposure and consequent successive layerwise selective solidification of construction material layers of a construction material that can be solidified by means of an energy beam, and to a method for measuring the temperature at least of the solidified construction material of a three-dimensional object to be produced additively, at at least one measurement or spatial point. All the comments made relating to the apparatus apply similarly for the method or methods.

The invention is explained in more detail with the aid of exemplary embodiments in the figures of the drawing, in which.

Figure 1:
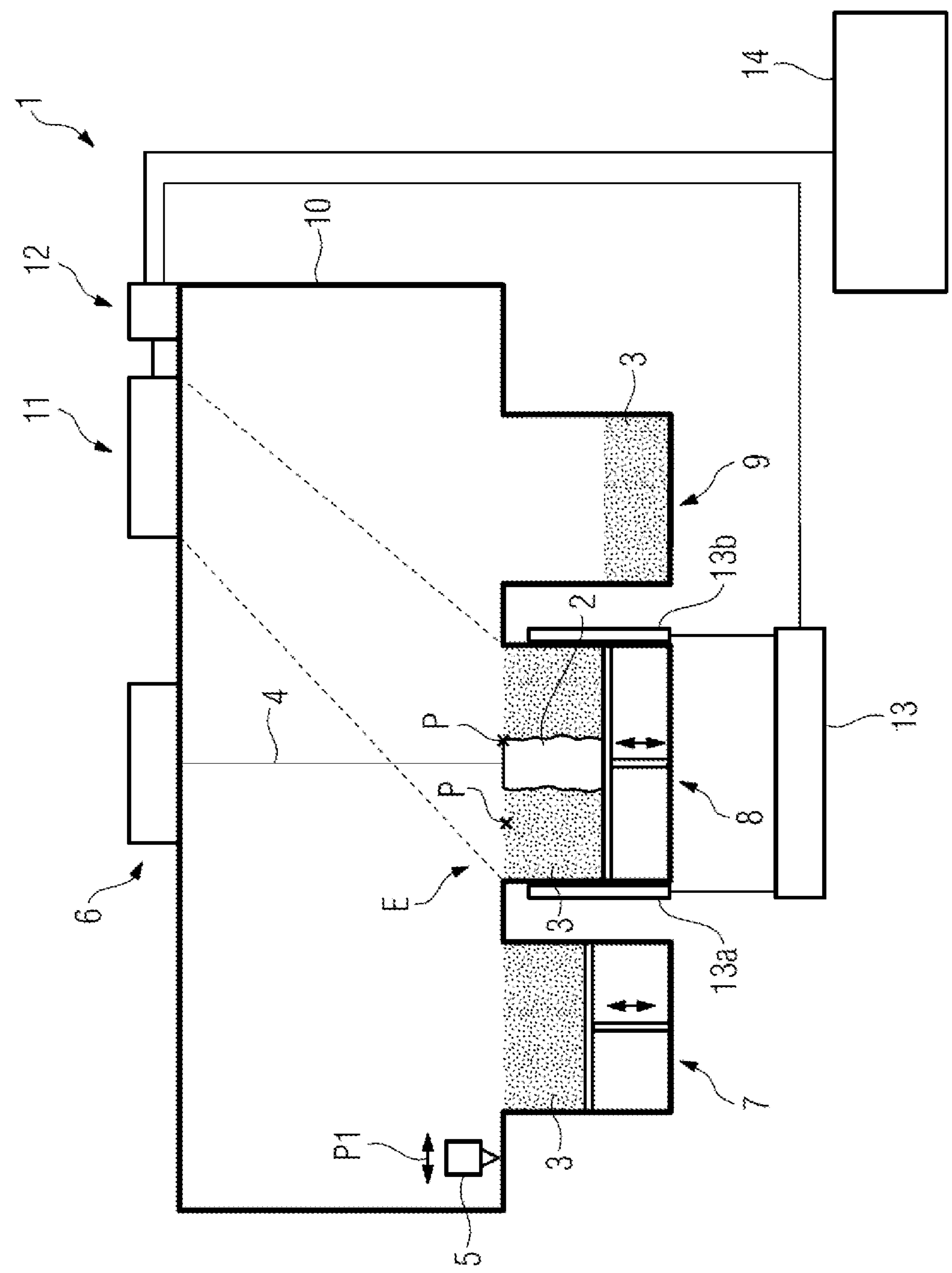
FIG. 1 shows a schematic representation of an apparatus according to one exemplary embodiment.

FIG. 1 shows a schematic representation of an apparatus 1 according to one exemplary embodiment. The apparatus 1 is used in general for the additive production of three-dimensional objects 2, i.e. in particular technical components or technical component groups, by successive layerwise selective exposure and consequent successive layerwise selective solidification of construction material layers of a construction material 3 that can be solidified, i.e. for example a metal powder, by means of an energy beam 4, i.e. in particular a laser beam. The selective solidification of respective construction material layers to be solidified is carried out on the basis of object-related construction data. Corresponding construction data describe the geometrical or geometry-design configuration of the object 2 respectively to be produced additively, and may for example contain "sliced" CAD data of the object 2 to be produced. The apparatus 1 may for example be configured as a LaserCUSING® apparatus, i.e. as an apparatus for carrying out selective laser melting methods (SLM methods).

The apparatus 1 comprises the functional component parts required in order to carry out additive construction processes; for example, a layering device 5 and an exposure device 6 are shown in FIG. 1.

The layering device 5 is configured in order to form construction material layers to be selectively exposed, or to be selectively solidified, in a construction plane E of the apparatus 1, and to this end comprises a layering element (not referred to in further detail), particularly in the manner or form of a blade, mounted movably—as indicated by the double arrow P1—relative to the construction plane E of the apparatus 1.

The exposure device 6 is configured in order to generate an energy beam 4 for the selective exposure of construction material layers to be selectively solidified, in the construction plane E of the apparatus 1, and to this end typically comprises a beam generating device (not shown) which is configured in order to generate the energy beam 4, optionally a beam steering device (not shown), also to be referred to as a scanner device, which is configured in order to steer the energy beam 4 generated by the beam generating device, for example onto a region to be exposed of a construction material layer to be selectively solidified, as well as various optical elements, for example filter elements, objective elements, lens elements, etc. (not shown).

FIG. 1 furthermore represents a dosing module 7, a construction module 8 and an overflow module 9, which are docked to a lower region of an inertizable process chamber 10 of the apparatus 1. The aforementioned modules 7-9 may also form a lower region of the process chamber 10 of the apparatus 1.

The apparatus 1 furthermore comprises a measuring device 11 in the form of a thermography camera, which may be configured in order to measure the temperature at one or more measurement points P. Such measurement points P—two measurement points P are represented purely by way of example in FIG. 1—may lie in the construction plane E or inside the construction module 8 on the surface of the three-dimensional object 2 already (partially) formed. Of course, measurement points P may also lie on a plurality of three-dimensional objects 2.

Furthermore represented are a temperature regulating device 12, as well as a temperature control or heating device 13 assigned thereto, which comprises for example two temperature control or heating elements 13*a*, 13*b* for heating and/or cooling the construction module 8, or the construction material 3 contained therein.

The temperature regulating device 12 may form a constituent part of a control unit (not shown) or be assigned to such a unit. The control unit is configured in order to evaluate the data determined by the measuring device, and optionally further information, and in order to output control signals to further structural functional component parts of the apparatus 1. For example, the control device may be configured in order, with the aid of the data which have been determined, to output control signals to the temperature regulating device 12, to the layering device 5 or to the beam generating device 6.

Furthermore represented is a displaying device 14, for example a display, with the aid of which the temperatures that have been determined can be represented in an allocation to the corresponding three-dimensional object 2, as well as further information derived from these values, for example the thermal gradient. The representations of the displaying device 14 may be displayed in various representation options that can be selected by a user. The displaying device 14 may also be configured as part of the measuring device 11.

Figure 2:
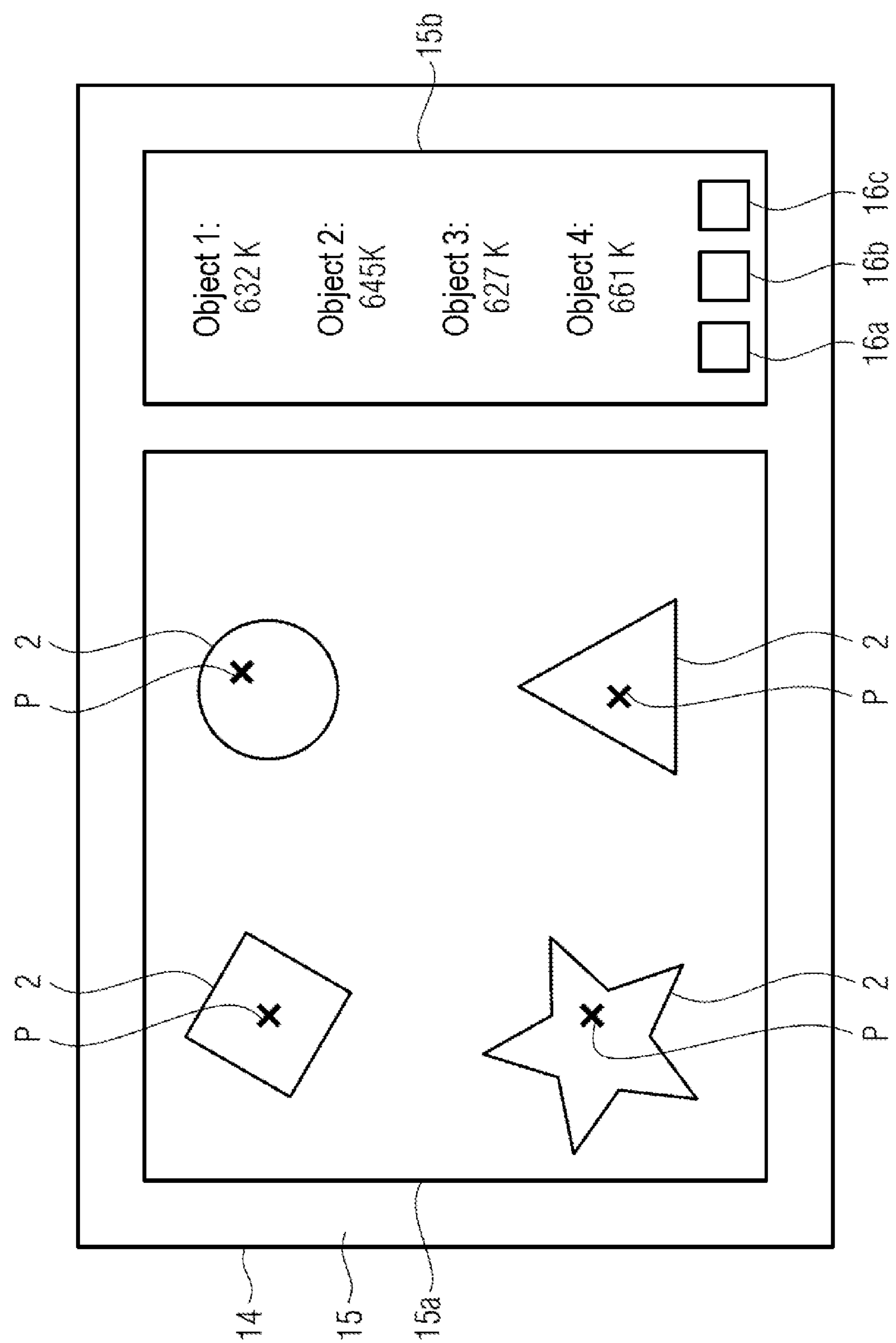
FIG. 2 shows a schematic representation of a display screen of a displaying device according to one exemplary embodiment.

FIG. 2 shows a schematic representation of a display screen of a displaying device 14 according to one exemplary embodiment.

It can be seen that the three-dimensional object 2 is graphically assigned to each measurement point P, at which a temperature has been determined, on a display area 15 of the displaying device 14. The formation of this object as a function of position and time may also be represented in this case.

In the exemplary embodiment shown, the temperature is measured at a plurality of measurement points P, specifically for example four measurement points, a particular three-dimensional object 2, or component, being assigned each of the four measurement points P. A further exemplary embodiment, in which a plurality of measurement points P are assigned to the same three-dimensional object 2, or component, is not represented.

It can be seen that the display area 15 is subdivided into two display area regions 15*a*, 15*b*. The objects 2 and the measurement points P are represented in a first display area region 15*a*. The temperatures (measurement values) assigned to the respective objects 2, here for example indicated as absolute temperatures in kelvin, are represented in a second display area region 15*b*.

In the second display area region 15*b*, there are furthermore menu points 16*a-c* which can be selected by a user, and by means of which a user can select a particular representation. By selecting the menu point 16*a*, for example, a tabular representation of the measurement values is possible, by selecting the menu point 16*b*, for example, a diagrammatic representation of the measurement points is possible, and by selecting the menu point 16*c*, for example, a representation of a temperature gradient as a function of position and/or time, for example of the objects 2, is possible.

The invention claimed is:

1. A system for additively manufacturing three-dimensional objects, the apparatus comprising:

an exposure device configured to generate an energy beam for selectively exposing successive layers of construction material, the energy beam causing selective solidification of exposed portions of the construction material;

a measuring device configured to determine for respective ones of the successive layers of construction material, a temperature measurement at a plurality of measurement points, the plurality of measurement points for a respective successive layer of construction material comprising (i) a first plurality of measurement points corresponding to a first three-dimensional object having been at least partially formed, and (ii) a second plurality of measurement points corresponding to a second three-dimensional object having been at least partially formed concurrently with the first three-dimensional object; and a display device comprising a display area comprising a first display area region and a second display area region, the display device configured to display in the first display area region on the display area, (i) a first graphical representation comprising the first three dimensional object and the first plurality of measurement points as a function of position and time, and (ii) a second graphical representation comprising the second three dimensional object and the second plurality of measurement points as a function of position and time, wherein the first graphical representation and the second graphical representation are displayed simultaneously, the display device further configured to simultaneously display in the second display area region on the display area, (i) at least one of the first plurality of measurement points, and (ii) at least one of the second plurality of measurement points.

2. The system of claim 1, wherein at least one of the plurality of measurement points resides along a construction plane, the construction plane being adjacent to a construction module in which the first three-dimensional object and/or the second three dimensional object are or have been at least partially formed.

3. The system of claim 1, wherein at least one of the plurality of measurement points comprises a two-dimensional coordinate that resides within a construction module in which the first three-dimensional object and/or the second three dimensional object are or have been at least partially formed.

4. The system of claim 1, wherein at least one of the plurality of measurement points resides along a construction plane, the construction plane being adjacent to a construction module in which the first three-dimensional object and/or the second three dimensional object are or have been at least partially formed; and wherein at least one of the plurality of measurement points resides within a construction module in which the first three-dimensional object and/or the second three dimensional object are or have been at least partially formed.

5. The system of claim 1, wherein the temperature measurement of the first plurality of measurement points and/or the temperature measurement of the second plurality of measurement points are repeated at a plurality of different times.

6. The system of claim 1, wherein the first graphical representation comprises a first thermal gradient of the first three-dimensional object, the thermal gradient determined based at least in part on the first plurality of measurement points; and/or wherein the second graphical representation comprises a second thermal gradient of the second three-dimensional object, the second thermal gradient determined based at least in part on the second plurality of measurement points.

7. The system of claim 1, comprising:

a temperature regulating device configured to regulate a temperature corresponding to at least one of the plurality of measurement points based at least in part on one or more temperature measurements determined with the measuring device.

8. The system of claim 1, wherein the system is configured to perform selective laser melting, selective laser sintering, or selective electron beam melting.

9. The system of claim 1, comprising:

a heating element configured to heat at least a portion of a construction module corresponding to at least one of the plurality of measurement points based at least in part on one or more temperature measurements determined with the measuring device.

10. The system of claim 1, comprising:

a cooling element configured to cool at least a portion of a construction module corresponding to at least one of the plurality of measurement points based at least in part on one or more temperature measurements determined with the measuring device.

11. A method of additively manufacturing three-dimensional objects, the method comprising:

selectively exposing successive layers of construction material to an energy beam from an exposure device, the energy beam causing selective solidification of exposed portions of the construction material;

determining with a measuring device, a temperature measurement at a plurality of measurement points for respective ones of the successive layers of construction material, the plurality of measurement points for a respective successive layer of construction material comprising (i) a first plurality of measurement points corresponding to a first three-dimensional object having been at least partially formed, and (ii) a second plurality of measurement points corresponding to a second three-dimensional object having been at least partially formed concurrently with the first three-dimensional object;

displaying on a first display area region of a display area of a display device, (i) a first graphical representation comprising the first three dimensional object and the first plurality of measurement points as a function of position and time, and (ii) a second graphical representation comprising the second three dimensional object and the second plurality of measurement points as a function of position and time, wherein the first graphical representation and the second graphical representation are displayed simultaneously; and displaying on the second display area region of the display area of the display device, (i) at least one of the first plurality of measurement points, and (ii) at least one of the second plurality of measurement points, wherein the at least one of the first plurality of measurement points and the at least one of the second plurality of measurement points are displayed simultaneously.

12. The method of claim 11, wherein at least one of the plurality of measurement points resides along a construction plane, the construction plane being adjacent to a construction module in which the first three-dimensional object and/or the second three dimensional object are or have been at least partially formed.

13. The method of claim 11, wherein at least one of the plurality of measurement points resides within a construction module in which the first three-dimensional object and/or the second three dimensional object are or have been at least partially formed.

14. The method of claim 11, wherein at least one of the plurality of measurement points resides along a construction plane, the construction plane being adjacent to a construction module in which the first three-dimensional object and/or the second three dimensional object are or have been at least partially formed; and wherein at least one of the plurality of measurement points resides within a construction module in which the first three-dimensional object and/or the second three dimensional object are or have been at least partially formed.

15. The method of claim 11, comprising:

repeating the temperature measurement of the first plurality of measurement points and/or the temperature measurement of the second plurality of measurement points at a plurality of different times.

16. The method of claim 11, wherein the first graphical representation comprises a first thermal gradient of the first three-dimensional object, the thermal gradient determined based at least in part on the first plurality of measurement points; and/or wherein the second graphical representation comprises a second thermal gradient of the second three-dimensional object, the second thermal gradient determined based at least in part on the second plurality of measurement points.

17. The method of claim 11, comprising:

regulating with a temperature regulating device, a temperature corresponding to at least one of the plurality of measurement points based at least in part on one or more temperature measurements determined with the measuring device.

18. The method of claim 11, wherein the system is configured to perform selective laser melting, selective laser sintering, or selective electron beam melting.

19. The method of claim 11, comprising:

heating with a heating element, at least a portion of a construction module corresponding to at least one of the plurality of measurement points based at least in part on one or more temperature measurements determined with the measuring device; and/or cooling with a cooling element, at least a portion of a construction module corresponding to at least one of the plurality of measurement points based at least in part on one or more temperature measurements determined with the measuring device.

* * * * *